July 25, 1961

S. M. ENTERLINE ET AL 2,993,609

METAL CHARGING APPARATUS

Filed Nov. 7, 1958

INVENTORS:
STEVENSON M. ENTERLINE
JAMES F. PIERCE, SR.
BY
Jasper T. Serijan
ATTORNEY

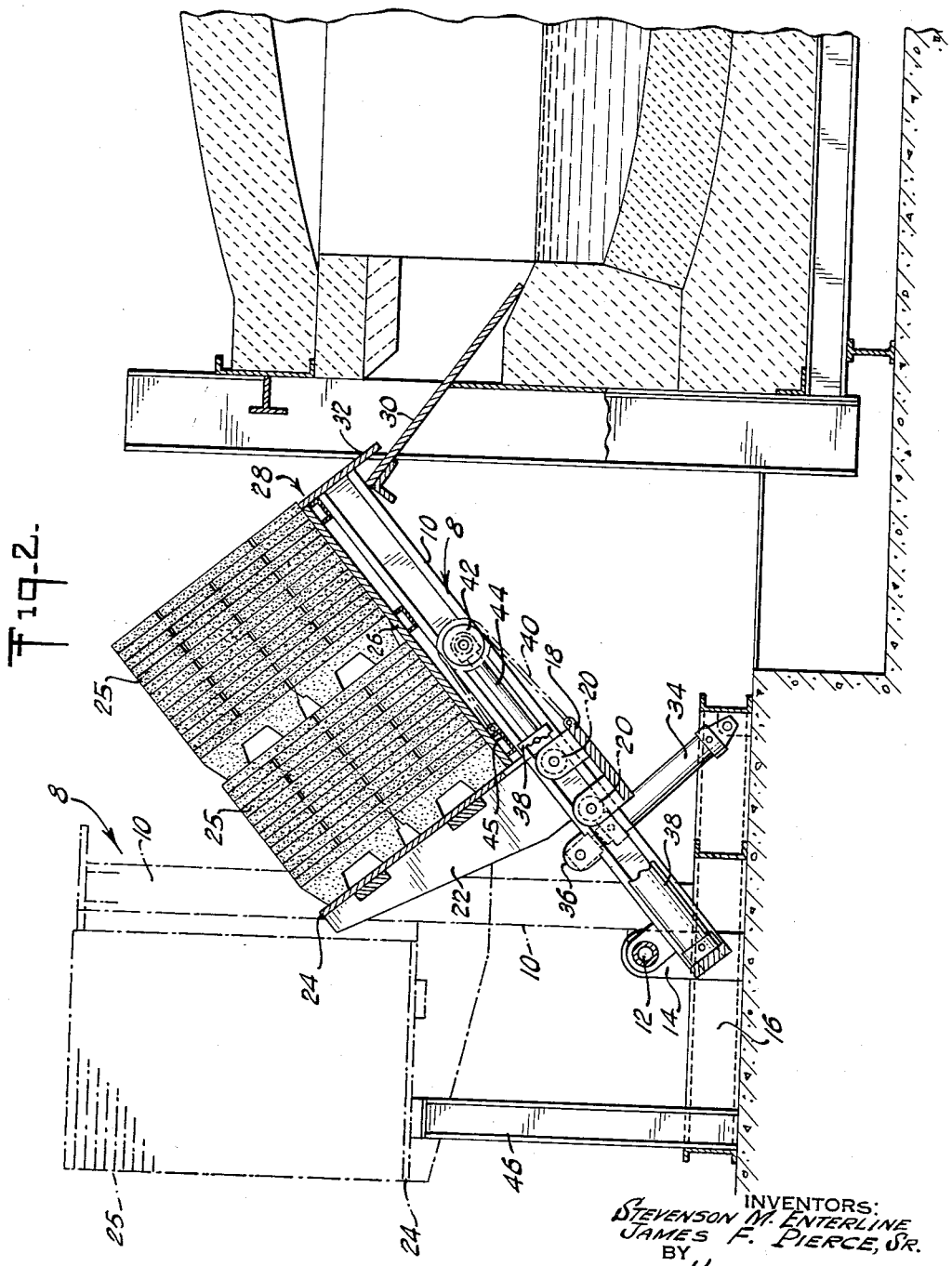

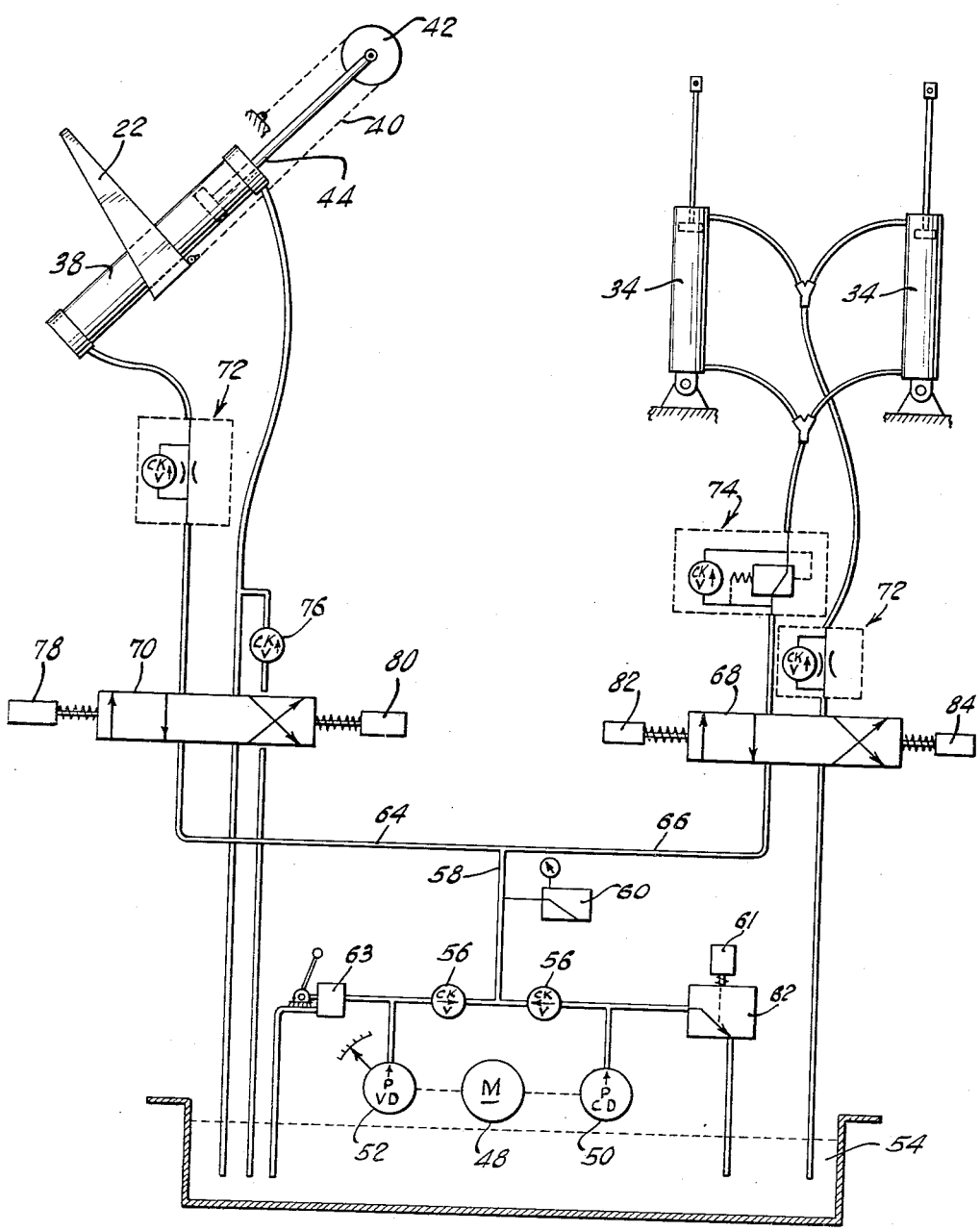

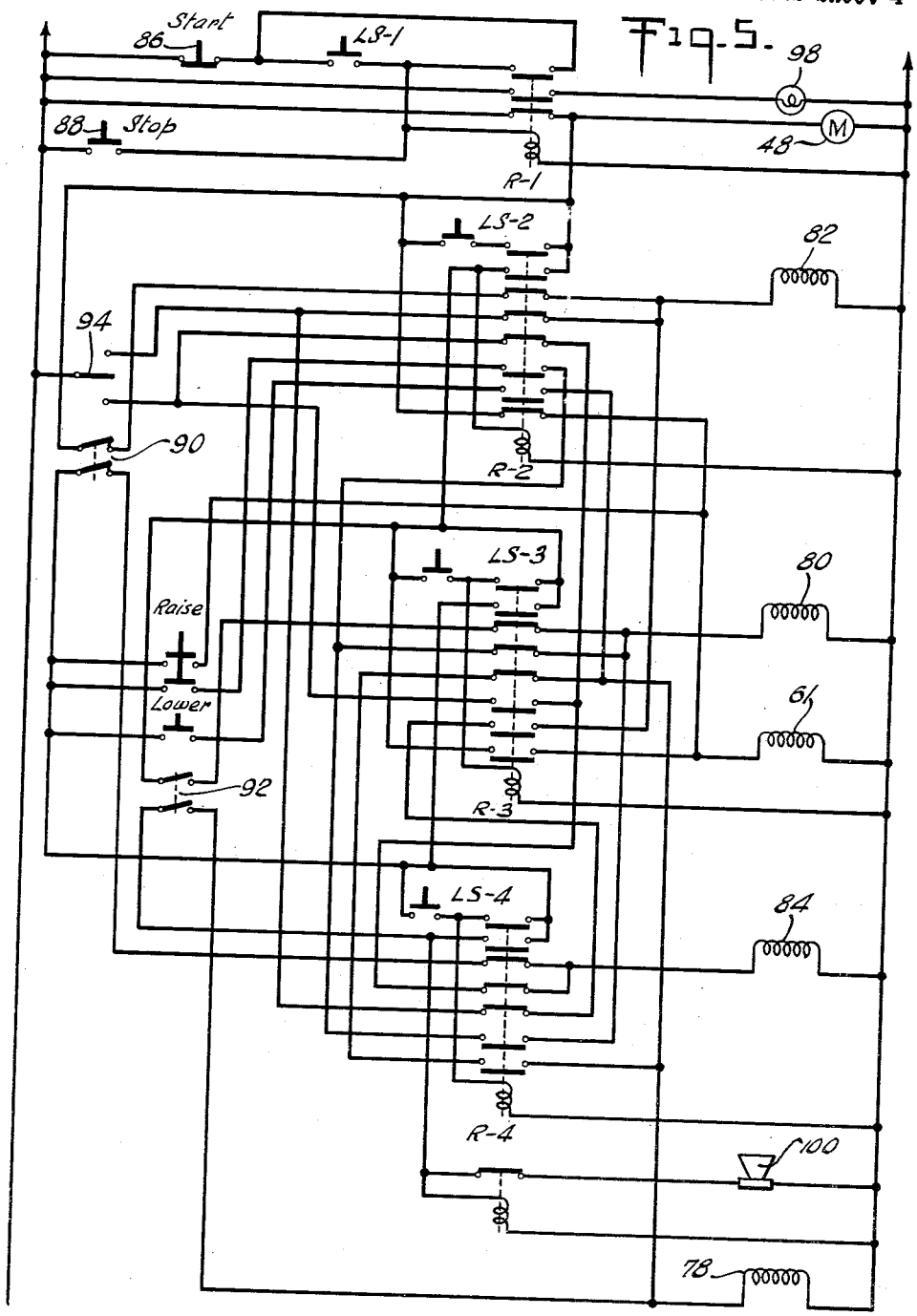

United States Patent Office 2,993,609
Patented July 25, 1961

2,993,609
METAL CHARGING APPARATUS
Stevenson M. Enterline, Matawan, N.J., and James F. Pierce, Sr., Blackwell, Okla., assignors to American Metal Climax, Inc., New York, N.Y., a corporation of New York
Filed Nov. 7, 1958, Ser. No. 772,532
10 Claims. (Cl. 214—152)

This invention relates to apparatus for charging or feeding metal bodies to a metallurgical operation and more particularly to a machine for charging pre-stacked or palletized metal bodies such as zinc slabs to a melting furnace or the like.

In the use of metal melting facilities designed to provide a substantially continuous supply of molten metal for a subsequent operation, there are appreciable advantages in operating either a furnace or kettle so that charging, melting and metal consumption take place more or less simultaneously and continuously with a view to eliminating radical fluctuations in metal bath temperatures and levels. These advantages are particularly desirable, for example, in the melting of zinc slabs in a furnace to provide a feed for further refining of the zinc as described in copending application Serial No. 753,755, or in the art of galvanizing where the zinc is usually melted in a kettle and is then continuously consumed therefrom.

Although various types of apparatus adapted for charging slabs into a metal furnace have been previously described, there is not presently available, within our knowledge, a basically simple machine capable of receiving a plurality of metal bodies as provided, for example, in a pallet and the like and thereafter controllably discharging the bodies either individually, in pairs or as otherwise desired to maintain the desired rate of metal discharge into the furnace. Moreover, since the prior art devices are usually limited with respect to variations in size, shape or thickness of the metal bodies being handled thereby, a definite need exists for a charging apparatus which is capable of handling metal bodies varying in size, shape or thickness, particularly adaptable to handling so-called "palletized" metal bodies in the form of slabs, bars, ingots or plates and the like. Those skilled in the art will readily recognize that pallets comprise the prevalent manner in which such metal bodies are shipped by producers to the consumers. A significant feature of the present apparatus is that variations in the individual thickness, size and arrangement of the bodies comprising the pallet including the usual "feet" which are normally cast of the same metal as the rest of the pallet but vary considerably in configuration do not adversely affect the desired control in the metal discharging operation function.

While the precise nature of the apparatus comprising the present invention will be described in relation to the charging of zinc slabs to a melting furnace, it will be understood that the usefulness of the invention is not limited thereto and may be used to advantage for charging or feeding other stacked metal bars, ingots, slabs, other shapes or materials as will become readily apparent as this specification proceeds.

The charging or feeding machine comprising the present invention consists essentially of a tiltable elevator structure carrying a moveable platform upon which one or more pallets or loads of stacked metal bodies such as slabs may be placed while the elevator structure is in a vertical position at which time the load carrying platform is in a horizontal position particularly suitable for being loaded mechanically, as with a fork truck or the like. The entire platform carrying structure is then tilted toward the feeding position of the associated metallurgical operation requiring the supply of metal to the extent that the uppermost layers of slabs in the stack tend to slide in the direction of tilt. However, a premature discharge of the slabs on the platform is prevented by their coming to rest against a restraining plate which is fixed to the elevator structure and extends upwardly at least to the desired elevation of the discharge. However, when the elevator platform is then raised at a predetermined rate along the tilted structure to a point such that a layer of the stacked metal slabs is moved clear of the upper edge of the restraining plate, the slabs comprising the layer can slide off the stack and into the feed opening or chute of the associated metallurgical operation at a rate which may be effectively controlled over the period during which the platform moves upward. When the top of the movable elevator platform reaches the level corresponding to the top edge of the restraining plate all of the metal slabs originally carried on the platform will have been discharged therefrom. Thereupon the elevator structure is returned from its tilted position, the platform is lowered, and may be resupplied with a fresh stack of slabs and the cycle repeated.

Further advantages and details of the present invention will become apparent by reference to a preferred structural embodiment for the charging of palletized zinc slabs to a melting furnace which is set forth hereinafter, and which will be described particularly in conjunction with the acompanying drawings, in which:

FIG. 2 is a side elevation showing the charging apparatus in the tilted position in operative association with a melting furnace into which the two stacked pallets of zinc slabs contained on the load platform are to be gradually fed;

FIG. 3 is a simplified semi-schematic representation of a hydraulic circuit for effecting the operation of the charging apparatus;

FIG. 5 shows an electrical circuit suitable for controlling the operation of the hydraulic system shown in FIG. 3.

Figure 1:
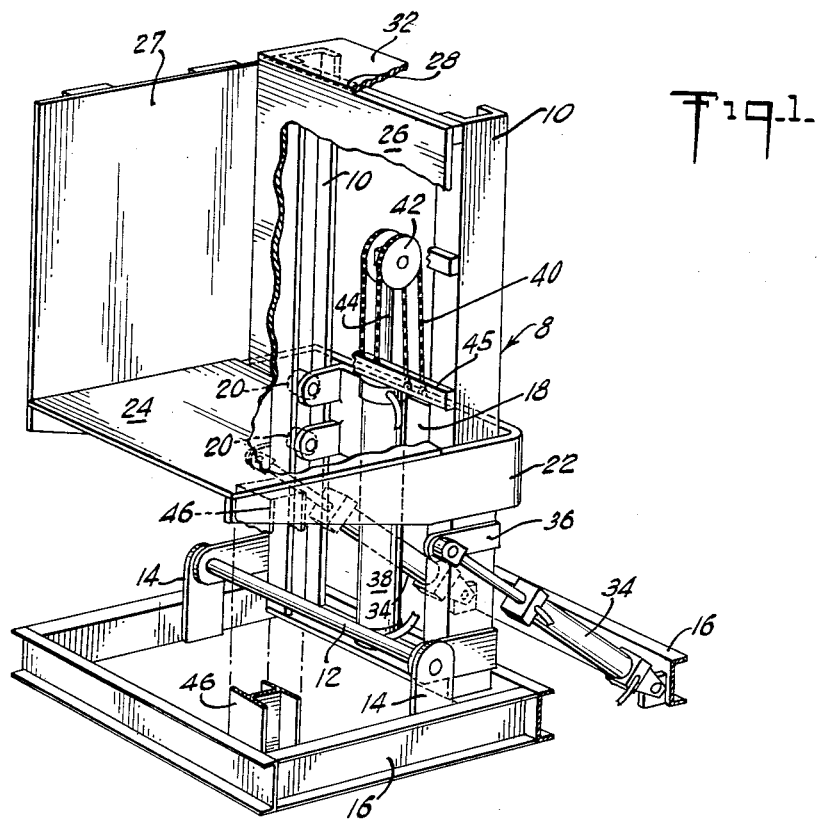
FIG. 1 is a general perspective view of the apparatus with the elevator platform shown empty and with portions of the restraining plate and platform being broken away to reveal the essential elements of the structure.

The embodiment shown in FIGS. 1 and 2 comprises an elevator structure 8 consisting of opposed guide channels 10 that are hingedly engaged near one end to pivot about the horizontal shaft 12 which is supported in suitable mountings 14 fixed to the machine base structure 16, the latter being preferably anchored to the floor. The guide channels 10 are bridged by the crosshead member 18 which is provided with suitable rollers 20 operating in the guide channels 10 to enable longitudinal movement of the crosshead member in and along the guide channels 10. Rigidly attached to the crosshead 18 and passing exteriorly of each of the channels 10 there is provided load platform supports 22 upon which a load platform 24 of sufficient size to receive a full pallet of zinc 25 is firmly affixed. On the platform side of the channels 10 there is rigidly attached to both channels 10 a stationary restraining plate 26 which extends laterally between both said channels upwardly to the discharge point 28 of the machine and downwardly to a point determined by the lowermost position of the platform 24. The platform 24 and its supports 22 are provided with sufficient clearance to override the stationary plate 26 for the entire length of the platform travel along the channels 10. Thus, even with the machine in a tilted position there will be no spill-off from the two-pallet high stack of slabs shown cradled between the platform 24 and the restraining plate 26 until the upward movement of the platform first raises the topmost layer of slabs above the upper edge of the restraining plate 26 thereby enabling that entire layer of slabs to slide off the pile and into furnace feed chute 30. An auxiliary guide plate 32 is shown affixed at the top of the restraining plate 26 to facilitate the movement of the slabs into the furnace feed chute. To assist in containing the stacked slabs on the platform 24 more securely, auxiliary supports 27 of any suitable nature may also be advantageously affixed to the platform for movement therewith.

Actuation of the machine involving its two basic movements, namely pivotal movement of the elevator structure 8 about the shaft 12 and longitudinal movement of the load platform 24 and its supports 22 along the channels 10 is effected preferably by hydraulic pistons operated, for the first motion, in one or more hydraulic tilt cylinders 34 attached to the elevator structure 10 by the cranks 36 and for the second motion in an hydraulic elevating cylinder 38 positioned intermediate the guide channels 10. The elevating cylinder tilts with the entire elevator structure and is operable in both the tilted and vertical positions of the elevator structure 8, although, as will hereafter be seen, there is a preferred sequence of operation. A double set of sprocket chains 40 are connected at one end to the crosshead structure 18 and extend over a double sprocket 42 on the upper end of the piston rod 44 which projects from hydraulic cylinder 38 and at the other end are anchored to a suitable point, such as a horizontal crossbar 45 fixed between the channels 10 so that when the piston rod 44 and sprocket 42 are moved upward the crosshead structure 18 and its associated platform supports 22 and load platform 24 are caused to travel upwardly on the elevator structure.

Normally, the charging machine is loaded with palletized zinc slabs while in a position of rest at which time the elevator structure 8 is vertical and the load carrying platform 24 is horizontal and in its lowermost position and may rest on auxiliary supports 46 for additional stability in view of the mechanical shocks it may sustain during mechanical loading. The lowermost position to which the platform may be moved is governed by the extent to which the tilt cylinders 34 interfere with the downward movement of the platform supports 22. In the present embodiment, the lower limit of platform travel is established at a convenient height for mechanical loading at a point above the location of the tilt cylinders.

Referring now to FIG. 3, the cylinders 34 and 38 of the hydraulic system receive their supply of fluid at pressure from a constant volume pump 50 and a variable volume pump 52. The constant volume pump supplies a relatively larger volume of fluid than the variable volume pump and by a system of appropriate control means which is hereinafter discussed the output of the constant volume pump 50 is joined with the output of the variable delivery pump only to effect the desirably more rapid motions of the apparatus, namely, tilting from vertical, returning to vertical from tilt and lowering of the elevator platform. The actual raising of the elevator platform to effect the timed discharge of the slabs from the machine is a relatively much slower operation and therefore, during this portion of the operating cycle, only the lesser and controllable output of the variable volume pump 52 is utilized to move the piston rod 44 of the elevating cylinder 38 upward at the rate necessary to cause discharge of the platform load over the desired and pre-determined period of time. For example, the constant volume pump 50 may have a rated maximum output of about 350 cubic inches per minute whereas the variable volume pump 52 advantageously has an output adjustable from 0 to 180 cubic inches per minute and normally will operate at an output well below its maximum rated capacity to achieve a desired platform elevating speed in the order of 1/8 to 5 inches per minute.

Both the pumps 50 and 52 may be driven, as for example, on the common shaft of a suitable electric motor 48 and draw on a common reservoir tank 54 for the supply of hydraulic fluid such as oil. The pump outputs pass through the two check valves 56 and thence to main supply line 58 which for safety is provided with a pressure relief valve 60 equipped with a gage. Valve 62 which is normally open by-passes hydraulic pressure from pump 50 until closed by the energizing of its associated operating solenoid 61. Provision for by-passing pressure from pump 52 to tank 54 is made by the manual valve 63. From the fluid supply line 58, branch supply lines 64 and 66 feed pressure to the solenoid actuated 4-way distributing valves 68 and 70 which control the ingress and egress of fluid to respectively the pair of hydraulic tilt cylinders 34 connected in parallel and the single elevating cylinder 38. To provide for maintaining a constant speed of movement notwithstanding variations in the load, pressure compensated flow control valve assemblies 72 are inserted in the line connected to the rod end of tilt cylinders 34 and in the line to the head-end of elevating cylinders 38. The fluid line connected to the head-end of the tilt cylinders 34 is also provided with an adjustable constant pressure outlet or counterbalance valve assembly 74 which permits a control of the tilt rate by maintaining a constant pressure in cylinder 34 thereby preventing a destructive rate of tilt after the loaded elevator structure passes through its center of gravity and also arresting the tilting motion in the event of pump failure. A check valve 76 is provided in the line connected to the rod end of elevating cylinder 38 as shown.

The four-way valves 68 and 70 are each operated by means of two oppositely disposed solenoids indicated at 78 and 80 and at 82 and 84 which, when energized, displace the valve spools to the right or left of a normal central position thereby directing the flow of fluid as indicated by the arrows. In the center position all the valve ports are closed to either inflow or outflow of fluid so that any part of the system behind that valve is hydraulically locked in position when this is the case.

Figures 4A, 4B, 4C, 4D:
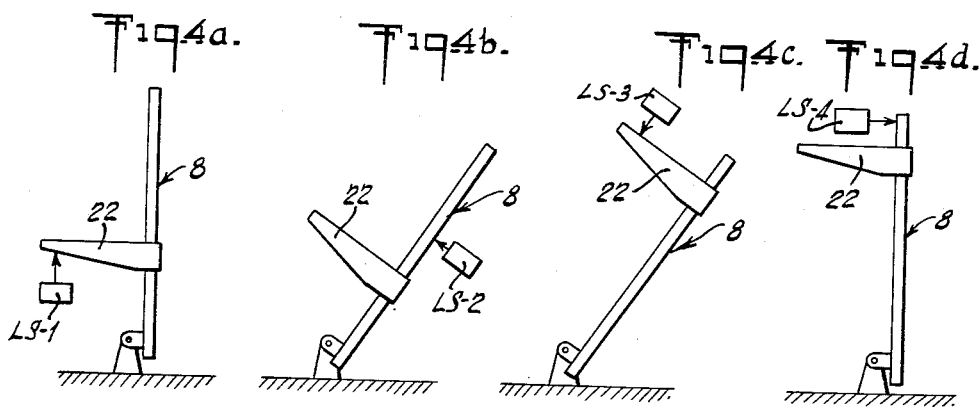
FIGS. 4a, 4b, 4c and 4d are schematic representations showing the several operative positions of the apparatus and the electrical limit switches actuated in each instance upon reaching these positions.

The above described hydraulic system is operated and sequenced in its operation by the actuation of appropriate electric push buttons and mechanically tripped limit switches. The latter are actuated when the machine reaches the various operational positions shown diagrammatically in FIG. 4. As there indicated, the limit switch LS–1 is actuated by the load carrying platform when the machine is in the loading or rest position (FIG. 4a). Limit switch LS–2 is actuated when the elevator structure 8 reaches the desired fully tilted position (FIG. 4b), and limit switch LS–3 is tripped when the load carrying platform reaches the top of its rise (FIG. 4c). Limit switch LS–4 is actuated when the elevator structure 8 returns to a vertical position (FIG. 4d), the cycle thereafter being completed upon return of the platform to the position shown in FIG. 4a.

With reference now to the circuit shown in FIG. 5, it will be apparent to those skilled in the art that the limit switches LS–1, LS–2, LS–3 and LS–4 are of the normally open type and may provide either a momentary or maintained contact in order to suitably operate the respective multi-contact, lock-in, relays R–1, R–2, R–3 and R–4 which are directly associated therewith. As will also be seen, the electrical control circuit additionally provides for a cycle start button 86 and an emergency stop-button 88, and double pole single throw switches 90 and 92 which are normally closed for automatic sequencing but, when opened, enable respectively the manual control of the tilting movement by manipulation of single-pole double-throw switch 94 or the manual control of load platform movement by pressing the push buttons 96a and 96b. A signal light 98 which is lighted when the charging machine has returned fully to the loading or rest position and a horn 100 are also provided to signal to the machine operator the completion of one charging cycle of the machine. With respect to the horn 100 it will be seen to be energized, through the contact of delayed opening type relay R–5. These contacts are normally closed until the relay is energized, which occurs, in this instance, upon the actuation of limit switch LS–4, which is deliberately somewhat prior to the actual completion of the cycle.

In operation, the machine with its load in place on the platform is started by pushing the start button 86 whereupon the pump motor starts. At the same time, solenoid 61 of valve 62 is energized thereby closing valve 62 and solenoid 82 of valve 68 is also energized and hydraulic fluid from both pumps 50 and 52 is supplied to the rod end of both tilt cylinders causing the elevator structure 8 to be tilted to the predetermined angle of tilt. This angle may vary depending upon the nature and smoothness of the material being charged by the machine. For use with zinc slabs, for example, it has been found that an angle of from 45–50° from vertical is generally satisfactory. When fully tilted, limit switch LS–2 is actuated causing solenoid 82 of the valve 68 and solenoid 61 of valve 62 to be deenergized while at the same time solenoid 80 of valve 70 is energized. Only the controllable flow of hydraulic fluid from variable delivery pump 52 is now applied to the head-end of cylinder 38 and the platform 24 rises slowly but steadily at a rate determined by the pre-set output of pump 52 causing successive layers of zinc slabs to be discharged by the machine as these slabs are raised above the upper edge 28 of the restraining plate 26. When the platform has risen to such point that the last slab has been discharged therefrom limit switch LS–3 is actuated which deenergizes solenoid 80 of the valve 70, reenergizes the solenoid 61 of valve 62 and energizes solenoid 84 of valve 68 thus causing hydraulic fluid from both pumps to be fed to the head-end of tilt cylinders 34 thereby returning the elevator structure 8 to the vertical position. In the vertical position limit switch LS–4 is momentarily actuated thereby deenergizing solenoid 84 of valve 86 and energizing solenoid 78 of valve 70 to cause the full volume of fluid from both pumps to be applied to the rod end of elevating cylinder 38 thereby rapidly lowering the platform 24. At the same time, relay R–5 becomes energized to sound the horn 100. When the platform has descended to the loading position, LS–1 is momentarily actuated thereby energizing and locking in relay R–1 which in turn (a) stops pump motor 48, (b) lights the reload signal light 98 and (c) deenergizes and unlocks the relays R–2, R–3, R–4 and R–5 thereby making the machine ready for a new cycle after it has been reloaded with a fresh supply of palletized zinc slabs.

While in the foregoing specification the nature and operation of the charging machine comprising this invention has been described in relation to a preferred embodiment thereof in connection with the charging of zinc slabs and specific details of this embodiment have been set forth for purpose of illustration, it will be apparent to those skilled in the art that this invention is susceptible to other embodiments and that many of the structural details herein set forth can be varied considerably. By way of illustration, the means for operating the machine may be purely mechanical rather than hydraulic or the substantially automatic sequence of the events in the machine operation cycle may be converted to a purely manual control by appropriate changes in the electrical circuit or both without, however, departing from the basic concept of the invention as defined by the appended claims.

We claim:

1. A charging machine for feeding metal bodies to an associated metallurgical operation comprising, in combination, an elevator structure adapted to be pivoted from a vertical loading position to tilt said elevator structure to a forwardly inclined charging position about a horizontal axis, said axis passing through said structure near the lower end thereof; a load platform carriage to support said metal bodies mounted on said elevator structure and adapted for longitudinal movement therealong and tiltable therewith; means for pivoting said elevator structure simultaneously with the load platform carriage supported thereon about said horizontal axis; a restraining element fixed to said elevator structure and positioned to have said metal bodies rest thereon when said elevator structure is inclined in the charging position; and means for effecting longitudinal movement of said load platform carriage along said elevator structure to push said metal bodies resting on said restraining element toward the upper end thereof.

2. Apparatus according to claim 1 in which said means for pivoting said elevator structure between the loading position and the charging position comprises at least one hydraulic cylinder having one end portion pivotally secured to a stationary part of the apparatus and having a piston slidable in said cylinder and pivotally connected to said elevator structure.

3. Apparatus according to claim 1 in which said elevator structure comprises a pair of opposed channels providing guide means for slidably engaging said load platform carriage comprising a cross-head member, supports extending from said cross-head member, and a platform mounted on said supports; and in which said means for effecting lonigtudinal movement comprises a hydraulic cylinder anchored at its one end to said elevator structure and having a piston rod carrying at least one pulley, and flexible means trained over said pulley and anchored at one end to a part of said elevator structure and connected at its other end to said cross-head member so that the amplitude of movement of said piston rod is one-half the amplitude of the movement of said cross-head member.

4. Apparatus according to claim 1 wherein said elevator structure comprises a pair of opposed channels and said restraining element comprises a rectangular plate affixed rigidly between said channels whereby the upper edge of said plate defines the point of discharge of metal bodies carried on said load platform.

5. A charging machine for feeding metal bodies to an associated metallurgical operation comprising in combination an elevator structure pivotable from a vertical loading position to an inclined charging position around a horizontal axis passing through said structure near the lower end thereof; a load platform movably mounted on said elevator structure for longitudinal motion therealong and tiltable therewith; means for pivoting said elevator structure together with the load platform mounted thereon about said axis, a restraining element fixed to said elevator structure and positioned to have said metal bodies rest thereon when said elevator structure is inclined in the charging position; means for longitudinally moving said load platform along said elevator structure to push said metal bodies resting on said restraining element toward the upper end thereof; and control means for actuating said pivoting and moving means in a predetermined sequential manner.

6. Apparatus according to claim 5 wherein said control means comprise electrical contacting elements with the first such element operable when said elevator structure is in vertical position and the load platform is fully descended, a second such element operable when said elevator structure is sufficiently pivoted to an inclined charging position, a third such element operable when said load platform reaches a level opposite the top of said restraining element and a fourth such control element operable when said elevator structure has returned fully from an inclined position to a vertical position.

7. Apparatus according to claim 5 in which said pivoting and moving means are hydraulically operated pistons.

8. A charging machine for feeding metal bodies to a metal melting furnace said machine comprising, in combination, an elevator structure forwardly inclinable to at least 45° about a horizontal axis passing through said structure near the lower end thereof said inclination being measured from a vertical loading position to a second charging position; a load platform mounted for longitudinal movement along said elevator structure and tiltable therewith; a restraining element mounted on said elevator structure between said structure and said moveable load platform; hydraulic piston means for causing inclination of said elevator structure together with said load platform mounted thereon from said first vertical position to said second inclined position and subsequently returning said structure and load platform to a vertical position and hydraulic piston means for raising and lowering said load platform along said elevator structure between the upper and lower extremities of said restraining element.

9. Apparatus according to claim 8 wherein said elevator structure comprises two opposed channels providing guide means for slidably engaging said load platform comprising a cross-head member, and wherein said restraining element comprises a flat plate rigidly affixed across said two opposed channels.

10. The method of gradually feeding horizontally positioned metal slabs from a palletized stack thereof, which comprises placing said stack on a platform and against a vertical restraining surface, tilting said stack jointly with said platform and said restraining surface to an angle of not more than 50 degrees from the vertical and in the direction causing said stack to rest on said restraining surface, and gradually moving said platform relative to said restraining surface while tilted to an oblique position to push said stack along said restraining surface toward the upper end thereof, thereby gradually feeding metal slabs a layer at a time from said stack as said metal slabs are pushed beyond said upper end of said restraining surface.

References Cited in the file of this patent

UNITED STATES PATENTS

| | | |
|---|---|---|
| 1,032,306 | Spencer | July 9, 1912 |
| 2,127,007 | Paxton | Aug. 16, 1938 |
| 2,397,129 | Davis | Mar. 26, 1946 |
| 2,468,326 | Gleason | Apr. 26, 1949 |
| 2,596,386 | Egge | May 13, 1952 |
| 2,867,341 | Tieslau | Jan. 6, 1959 |